No. 682,126. Patented Sept. 3, 1901.
J. CARRUTHERS & E. J. FITHIAN.
CLUTCH.
(Application filed Dec. 26, 1899.)
(No Model.)
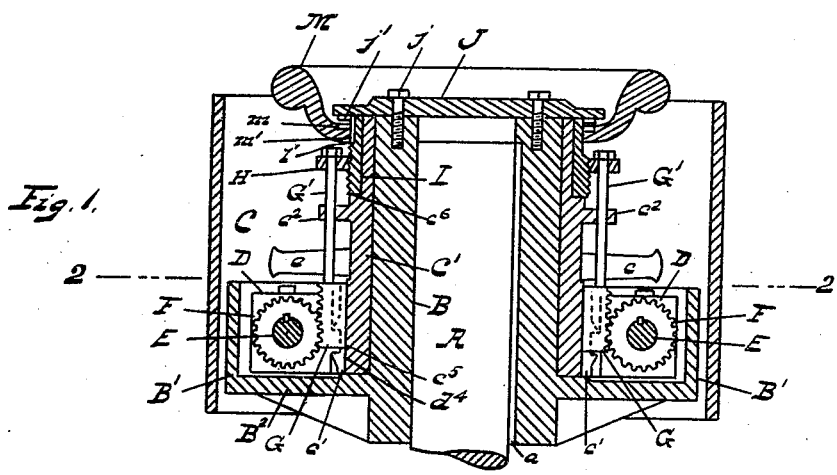
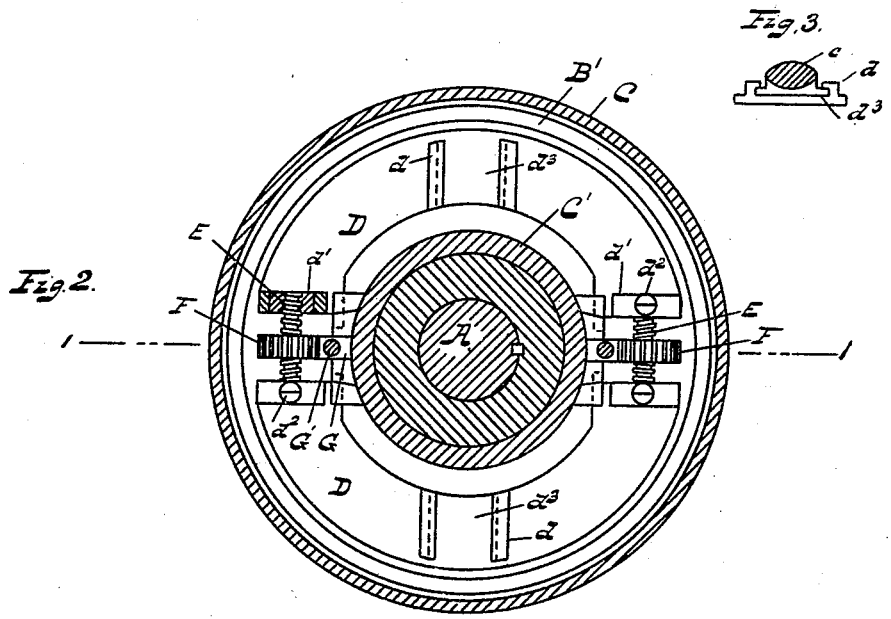
WITNESSES:
R. Lanza
Geo. M. Copenhaver
INVENTORS
John Carruthers
Edwin J. Fithian
BY
H. C. Lizz
ATTORNEY.

UNITED STATES PATENT OFFICE.

JOHN CARRUTHERS AND EDWIN J. FITHIAN, OF GROVE CITY, PENNSYLVANIA.

CLUTCH.

SPECIFICATION forming part of Letters Patent No. 682,126, dated September 3, 1901.

Application filed December 26, 1899. Serial No. 741,533. (No model.)

*To all whom it may concern:*

Be it known that we, JOHN CARRUTHERS and EDWIN J. FITHIAN, citizens of the United States, residing at Grove City, in the county of Mercer and State of Pennsylvania, have invented certain new and useful Improvements in Clutches; and we do hereby declare the following to be a full, clear, and exact description of the invention, such as will enable others skilled in the art to which it appertains to make and use the same.

This invention relates to clutches; and it consists in certain improvements in the construction thereof, as will be hereinafter fully described, and pointed out in the claims.

More particularly, our invention relates to that class of clutches shown and described in our Patent No. 641,370, granted January 16, 1900, wherein the construction herein shown is described, but not specifically claimed.

The invention is illustrated in the accompanying drawings, as follows:

Figure 1 shows a section on the line 1 1 in Fig. 2. Fig. 2 shows a section on the line 2 2 in Fig. 1. Fig. 3 shows a detail of construction.

A marks the shaft which in the construction shown carries the driving member of the clutch B, which is locked against rotative movement on the shaft by the key $a$. This driving member comprises the hub or sleeve B, the web $B^2$, which extends outwardly from it, and the flange B', the inner surface of which forms the friction-surface of the driving member.

The pulley C, which may be termed the "driven" member of the clutch, comprises the spoke $c$, extending from a hub C', which is journaled on the hub B of the driving member.

The friction-shoes D D are provided with the guide $d$, in which is a groove $d^3$. This groove is arranged to slide on guide $c^3$, preferably carried by the spoke $c$ of the pulley C. At the ends of the shoes are arranged the nuts $d'$, which are preferably removable and secured in place by the set-screws $d^2$. Lugs $d^4$ extend inwardly from the nuts $d'$ into grooves $c^5$ in lugs $c'$, extending from the hub C', and serve to guide the ends of the shoes. Reversely-threaded screws E are arranged to operate in the nuts $d'$. The gears F are secured upon these screws. Racks G are arranged to slide in the guides formed by the lugs $c'$ and to mesh the gears F. The rods G' extend from the racks G and are secured to a nut H. The rods G' extend through the perforated ears $c^2$, extending from the hub C', and these serve as guides for the rods. The nut H is screw-threaded and arranged to operate upon the screw-sleeve I. The screw-sleeve I is journaled on the hub C' of the pulley C. The pulley C is held in place on the hub B by the spider $B^2$ and a cap J. The cap J is secured to the hub B by the set-screws $j$ and extends outwardly beyond the hub B, forming a flange, against which the hub C' and the screw-sleeve I abut. A shoulder $c^6$ on the hub $c'$ prevents auxiliary movement of the screw I in an inward direction. Keyed upon the screw-sleeve I is a hand-wheel M, so arranged as to permit of equal movement on the screw-sleeve. The detents $j'$ are arranged on the cap J, and the hand-wheel M is provided with similar detents $m$, which are adapted to be brought into engagement with the detents $j'$, thus forming a clutch.

The operation of the device is as follows: The driving member of course, so far as the clutch is concerned, is supposed to have constant motion. When it is desired to lock the driven member with the driving member, the hand-wheel is grasped and drawn upwardly, thus bringing the auxiliary clutch formed by the detents $j'$ and $m$ into engagement. This locks the screw-sleeve I with the driving member and turns the screw-sleeve I into the nut H. This produces an auxiliary movement of the rods G', and consequently the racks G. These operating upon the gears F turn the screws E and separate the shoes, forcing them into engagement with the inside of the flange B', thus setting the clutch. This mechanism has power up to the strength of the materials, because so long as there is any relative movement between the driving and driven members the screw-sleeve I continues to have relative movement to the nut H, so that the pressure on the clutch-shoes is increased so long as there is such relative movement. When it is desired to throw the clutch out of action, the hand-wheel is grasped or pushed inwardly, so as to throw the auxiliary clutch out of action, and a brake-pressure is exerted on the hand-wheel either by the hands or special device brake mechanism. This turns the screw-sleeve in a direction opposite to that which the driving and driven elements are moving, consequently moving the rod G' in a direction opposite to the one in which they are moving to set the clutch, so that the clutch-shoes are moved out of action by a reversed movement of the parts actuated to set them.

What we claim as new is—

1. In a friction-clutch, the combination with the driving and driven members; of a friction device interposed between said members, comprising friction-shoes arranged to be moved into and out of rotative engagement by movement in a radial direction; a screw journaled on the driven member; means actuated by the relative movement of the members, one to the other, for actuating said screw; and means for actuating said screw in a reverse direction while the clutch members are in motion.

2. In a clutch, the combination of the driving member, B; the driven member, C, journaled thereon; the sleeve, I, journaled on the driven member; a nut, H, on the sleeve, I, and means actuated by the nut, H, for locking the driving and driven members together.

3. In a clutch, the combination of the driving member B; the driven member, C, journaled thereon; the screw-sleeve, I, journaled on the driven member; the nut, H, arranged on the screw, I; means actuated by the nut, H, for locking the driving and driven members together; the wheel, M, secured to the sleeve, I, and arranged to have axial movement thereon; the cap, J, and the clutch mechanism between the clutch, J, and the wheel, M.

4. In a clutch, the combination of the driving member B, having the web, B² and friction-flange, B' thereon; the driven member, C, having the hub, C', journaled on the driving member; the sleeve, I, journaled on the hub, C'; the nut H, arranged on the sleeve, I; rods, G' and racks, G, secured to said nut; gears, F, arranged to mesh the racks, G; reversely-threaded screws, E, secured to said gears, F; friction-shoes, D, arranged to be actuated by said screws, E; the wheel, M, secured to the sleeve, I, and means for locking and unlocking said wheel, M, with the driving member B.

In testimony whereof we affix our signatures in presence of two witnesses.

JOHN CARRUTHERS.
EDWIN J. FITHIAN.

Witnesses:
W. W. GRAHAM,
L. M. FITHIAN.